3,068,249
ALKYL ETHERS OF 17-(HYDROCARBON-SUBSTI-
TUTED)ESTR-4-ENE-3,17-DIOLS
Frank B. Colton, Chicago, and Richard E. Ray, Morton
Grove, Ill., assignors to G. D. Searle & Co., Chicago,
Ill., a corporation of Delaware
No Drawing. Filed Dec. 15, 1960, Ser. No. 75,915
4 Claims. (Cl. 260—397.5)

The present invention is concerned with novel steroidal alkyl ethers and, more particularly, with alkyl ethers of 17-(hydrocarbon-substituted)estr-4-ene-3,17-diols as represented by the structural formula

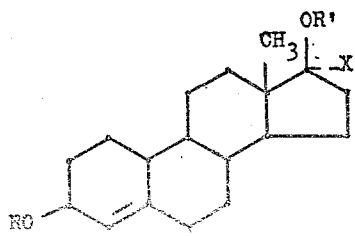

wherein R is a lower alkyl radical, R' is hydrogen or a lower alkyl radical, and X is a hydrocarbon substituent selected from the class comprising lower alkyl, alkenyl, and alkynyl radicals.

Examples of the aforementioned lower hydrocarbon radicals are methyl, ethyl, propyl, butyl, pentyl, hexyl, vinyl, propenyl, hexenyl, ethynyl, propynyl, pentynyl, hexynyl, and the branched-chain isomers thereof.

The compounds of this invention are conveniently manufactured by alkylation of the corresponding 17-substituted estr-4-ene-3,17-diols. Treatment of the appropriate diol with methanol in the presence of an acidic catalyst produces the instant 3-monomethyl ethers. A specific example of this process is the reaction of 17α-ethynylestr-4-ene-3β,17β-diol with methanol and p-toluenesulfonic acid to afford 17α-ethynyl-3β-methoxy-estr-4-en-17β-ol.

The instant 3,17-diethers are obtained by alkylation of the disodium derivative of the aforementioned diols with the appropriate alkyl halide. For example, 17α-ethynylestr-4-ene-3β,17β-diol is treated with sodium in liquid ammonia to form the disodium derivative, then with methyl iodide to produce 17α-ethynylestr-4-ene-3β,17β-diol 3,17-dimethyl ether.

The 17α-alkenyl compounds of this invention can be produced by the methods described supra or, alternatively, by partial catalytic hydrogenation of the corresponding 17α-alkynyl compound. A typical embodiment of this process involves the reduction of 17α-ethynyl-3β-methoxyestr-4-en-17β-ol with hydrogen in the presence of a 5% palladium-on-calcium carbonate catalyst to afford 3β-methoxy-17α-vinylestr-4-en-17β-ol.

The compounds of this invention are useful as a result of their valuable pharmacological properties. In particular, they are able to induce the uterine endometrial proliferation typical of progesterone, in contrast to the estrogenic effect produced by related prior art compositions.

The following examples illustrate the invention more fully, but are not to be construed as limiting, either in spirit or in scope. In these examples, temperatures are given in degrees centigrade (° C.), and quantities of materials in parts by weight unless otherwise noted.

Example 1

A mixture of 14 parts of 17α-ethynylestr-4-ene-3β,17β-diol, 0.5 part of p-toluenesulfonic acid, and 200 parts of methyl alcohol is stored at room temperature for about 24 hours, then poured into ice water. The resulting aqueous mixture is extracted with ethyl acetate, and the organic layer is washed with water, then dried over anhydrous sodium sulfate. Removal of the solvents by concentration in vacuo affords a semicrystalline residue, which is dissolved in benzene and chromatographed on silica gel. The chromatographic column is eluted with benzene solutions containing increasing proportions of ethyl acetate. The 5% ethyl acetate in benzene eluate is concentrated to dryness, and the resulting residue is crystallized from acetone-hexane to yield 17α-ethynyl-3β-methoxyestr-4-en-17β-ol, M.P. about 159–172°. Recrystallization from acetone-hexane affords a pure sample melting at about 172–179°. It displays infrared absorption maxima at about 2.72, 3.00, and 9.15 microns.

Example 2

A mixture of 3 parts of 17α-(1-propynyl)estr-4-ene-3β,17β-diol, 0.1 part of p-toluenesulfonic acid, and 60 parts of methyl alcohol is stirred at room temperature for about 4½ hours, then poured into ice water. The resulting crystals are collected by filtration, washed with water, and dried to yield crude 3β-methoxy-17α-(1-propynyl)estr-4-en-17β-ol, M.P. about 58–70°. This crude product is dissolved in benzene and chromatographed on silica gel. Elution with 5% ethyl acetate in benzene affords a fraction, which is crystallized from acetone-hexane to produce pure 3β-methoxy-17α-(1-propynyl)estr-4-en-17β-ol, M.P. about 122–126°. This substance is characterized by infrared absorption maxima at about 2.75, 6.00, and 9.18 microns.

Example 3

To 140 parts of liquid ammonia is added with stirring first 0.01 part of ferric nitrate, then 2.3 parts of sodium portionwise over a period of about 15 minutes. Stirring is continued for about 15 minutes, and a solution of 10 parts of 17α-ethynylestr-4-ene-3β,17β-diol in 133 parts of tetrahydrofuran is added dropwise over a period of about 15 minutes. This mixture is stirred for about 2 hours, and a solution of 9.58 parts of methyl iodide in 35 parts of ether is then added dropwise. Stirring is continued for about one hour, and the ammonia is allowed to evaporate from the stirred mixture over a period of about 15 hours. The residual mixture is poured into water, acidified with acetic acid, then extracted with ethyl acetate. This organic solution is washed successively with aqueous sodium bicarbonate and water, dried over anhydrous sodium sulfate, and concentrated to dryness in vacuo. The oily residue is dissolved in benzene and chromatographed on alumina. Elution with 2% ethyl acetate in benzene affords pure 17α-ethynylestr-4-ene-3β,17β-diol 3,17 - dimethyl ether as a clear oil. Infrared maxima are observed at about 3.01 and 9.16 microns.

Example 4

To a solution of 8.4 parts of 17α-ethylestr-4-ene-3β,

17β-diol in 200 parts of methanol is added 0.75 part of p-toluenesulfonic acid monohydrate, and the resulting mixture is allowed to stand at room temperature for about 5 hours, then neutralized with sodium acetate and diluted with water. Extraction with ether affords an organic solution which is washed with water, dried over anhydrous sodium sulfate, and concentrated in vacuo. A solution of the oily residue in benzene is chromatographed on silica gel. Elution with 10% ethyl acetate in benzene produces a fraction, which is crystallizes from ether-pentane to yield 17α-ethyl-3β-methoxyestr-4-en-17β-ol, M.P. 109–110°; [α]$_D$=+155° (chloroform). Infrared maxima are observed at about 2.71, 5.99, and 9.12 microns.

*Example 5*

To a solution of 2.23 parts of 17α-ethynyl-3β-methoxyestr-4-en-17β-ol in 150 parts of pyridine is added one part of 5% palladium-on-calcum carbonate catalyst and this mixture is stirred under hydrogen at a pressure of one atmosphere until one molecular equivalent of hydrogen is adsorbed. The catalyst is removed by filtration, and the filtrate is diluted with water, then extracted with ether. The organic layer is washed successively with dilute hydrochloric acid, aqueous sodium bicarbonate, water, and saturated aqueous sodium chloride, then dried over anhydrous sodium sulfate, and finally concentrated in vacuo to produce an oily residue. This residue is recrystallized twice from aqueous acetone to afford 3β-methoxy-17α-vinylestr-4-en-17β-ol, M.P. about 50–60°.

*Example 6*

The substitution of an equivalent quantity of 3β-methoxy-17α-(1-propynyl)estr-4-en-17β-ol in the procedure of Example 5 results in 3β-methoxy-17α-propenylestr-4-en-17β-ol.

*Example 7*

By substituting an equivalent quantity of 17α-methylestr-4-ene-3β,17β-diol and otherwise proceeding according to the process of Example 4, 3β-methoxy-17α-methylestr-4-en-17β-ol is obtained.

*Example 8*

The substitution of an equivalent quantity of 17α-(1-propynyl)estr-4-ene-3β,17β-diol in the procedure of Example 3 results in 17α-(1-propynyl)estr-4-ene-3β,17β-diol 3,17-dimethyl ether.

What is claimed is:
1. A compound of the structural formula

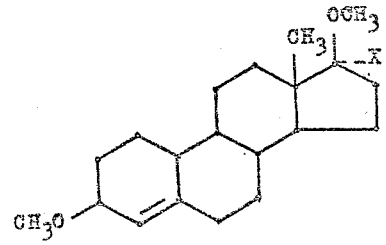

wherein X is a lower alkynyl radical.
2. 17α-ethyl-3β-methoxyestr-4-en-17β-ol.
3. 17α-ethynylestr-4-ene-3β,17β-diol 3,17 - dimethyl ether.
4. A compound of the structural formula

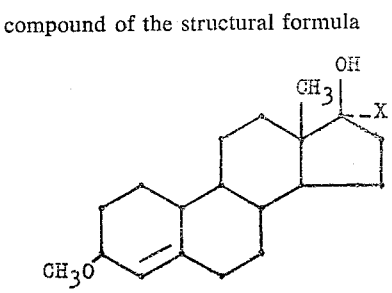

wherein X is a lower alkyl radical.

References Cited in the file of this patent
UNITED STATES PATENTS
2,843,609     Colton _____ July 15, 1958